(No Model.)

J. CARL.
COMBINED JELLY AND ICE CREAM TRAY.

No. 284,721. Patented Sept. 11, 1883.

WITNESSES:
Jos. K. Rosenbaum
Otto Risch

INVENTOR
John Carl
BY Joepel & Raegener
ATTORNEYS.

UNITED STATES PATENT OFFICE.

JOHN CARL, OF NEW YORK, N. Y.

COMBINED JELLY AND ICE-CREAM TRAY.

SPECIFICATION forming part of Letters Patent No. 284,721, dated September 11, 1883.

Application filed August 4, 1883. (No model.)

*To all whom it may concern:*

Be it known that I, JOHN CARL, of the city, county, and State of New York, have invented certain new and useful Improvements in Combined Jelly and Ice-Cream Trays, of which the following is a specification.

Jellies and ice-creams were heretofore served on separate trays, so as to require two waiters. The separate trays also take up more room on the table and occasion double expense to the caterer.

The object of this invention is to furnish a combined jelly and ice-cream tray by which both refreshments may be served at the same time and by the same waiter; and the invention consists of a jelly-tray provided with an upright center post upon which the ice-cream tray is supported by means of a downwardly-extending socket fitting over the center post of the jelly-tray. The lower portion of the jelly-tray is supported on a main tray, having a circular flange for collecting the dripping of the jelly through the perforations provided in the jelly-tray.

Figure 1:
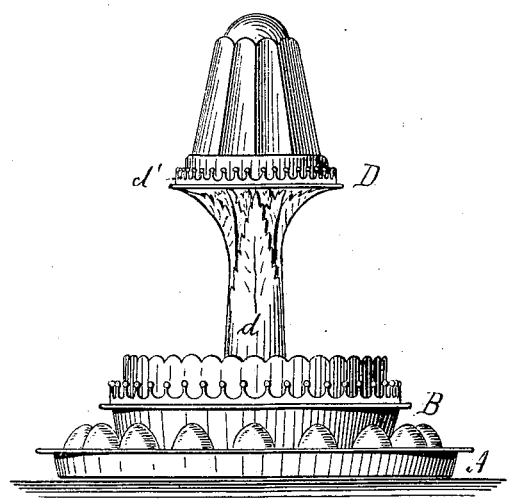
Figure 2:
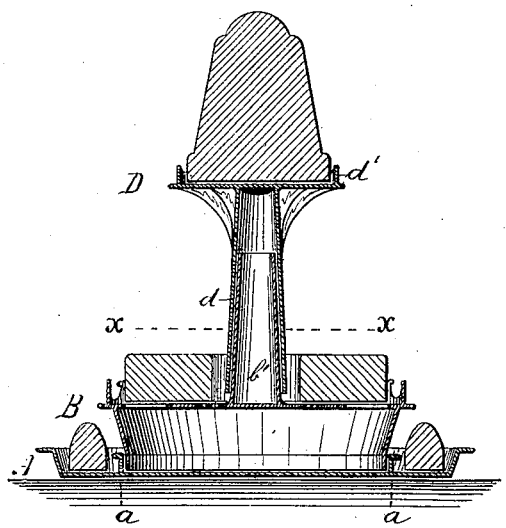
Figure 3:
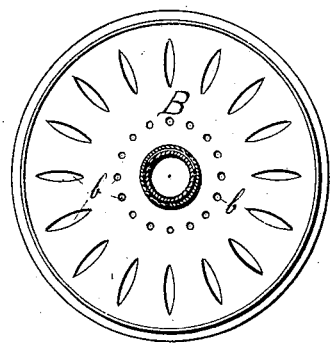
Figure 4:
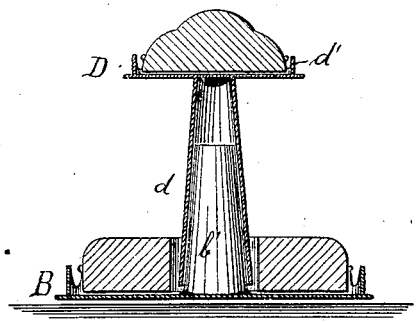

In the accompanying drawings, Figure 1 represents a side view of my improved jelly and ice-cream tray. Fig. 2 is a vertical central section, and Fig. 3 a horizontal section on line *x x*, Fig. 2, of the same. Fig. 4 is a vertical central section of my jelly and ice-cream tray in a simpler form.

Similar letters of reference indicate the corresponding parts.

In the drawings, A represents a main tray, which is made of metal or any other suitable material, and provided with a raised circular flange, *a*, that extends above the surface of the tray A. The cylindrical body or support of a jelly-tray, B, is secured in said flange, said jelly-tray being provided with perforations *b*, by which latter that portion of the jelly which liquefies by the heat is drained off into the space below. The jelly-tray B has an upright center post, *b'*, to which a detachable ice-cream tray, D, is applied by means of a downwardly-extending tubular socket, *d*. The ice-cream tray D is provided with a rim, *d'*, which serves to prevent the ice-cream as it melts from dripping off the tray. When the combined jelly and ice-cream tray is to be used, the detachable ice-cream tray is removed, the jelly placed upon the tray B, and the ice-cream tray again placed in position, after which the cream is put upon the tray D, while, finally, small cakes or jellies are placed on the main tray A around the base of the jelly-tray. In the simpler form of my combined tray the drip-receptacle of the jelly-tray is dispensed with, as shown in Fig. 4.

My improved jelly and ice-cream tray can be made of metal, glass, porcelain, or any other suitable material and in any suitable design or form. The downwardly-extending socket of the ice-cream tray can be properly ornamented, so that the entire tray presents a pleasing and neat appearance on the table, while it admits the serving of jelly and ice-cream from one tray and by the same waiter.

Having thus described my invention, I claim as new and desire to secure by Letters Patent—

1. A combined jelly and ice-cream tray, composed of a lower tray for jelly and a detachable upper tray for ice-cream, substantially as set forth.

2. A combined jelly and ice-cream tray, composed of a lower jelly-tray having an upright center post and of an upper ice-cream tray having a downwardly-extending socket fitting over the post of the jelly-tray, substantially as set forth.

3. In a combined jelly and ice-cream tray, the combination of a supporting main tray, a perforated jelly-tray connected thereto, and a detachable ice-cream tray supported on a center post of the jelly-tray, substantially as set forth.

4. The combination of a main tray having a vertical flange, a perforated jelly-tray fitting into said flange, and a detachable ice-cream tray connected by a socket to the center post of the jelly-tray, substantially as set forth.

In testimony that I claim the foregoing as my invention I have signed my name in presence of two subscribing witnesses.

JOHN CARL.

Witnesses:
PAUL GOEPEL,
SIDNEY MANN.